United States Patent
Moore

(10) Patent No.: US 9,846,996 B1
(45) Date of Patent: Dec. 19, 2017

(54) SYSTEMS AND METHODS FOR AUTOMATED TELLER MACHINE REPAIR

(71) Applicant: Wells Fargo Bank, N.A., San Francisco, CA (US)

(72) Inventor: Alicia Y. Moore, San Ramon, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 186 days.

(21) Appl. No.: 14/569,148

(22) Filed: Dec. 12, 2014

Related U.S. Application Data

(60) Provisional application No. 61/935,274, filed on Feb. 3, 2014.

(51) Int. Cl.
| | |
|---|---|
| G09G 5/00 | (2006.01) |
| G07F 19/00 | (2006.01) |
| G06T 19/00 | (2011.01) |
| H04L 29/08 | (2006.01) |
| G06Q 20/00 | (2012.01) |
| G06Q 20/02 | (2012.01) |

(52) U.S. Cl.
CPC .......... G07F 19/209 (2013.01); G06T 19/006 (2013.01); H04L 67/02 (2013.01); G06Q 20/00 (2013.01); G06Q 20/02 (2013.01); G06T 2219/012 (2013.01)

(58) Field of Classification Search
CPC ...... G06T 19/006; G06Q 20/00; G06Q 20/02; G07F 19/209; H04L 67/02
See application file for complete search history.

(56) References Cited

U.S. PATENT DOCUMENTS

| | | | | |
|---|---|---|---|---|
| 2007/0027696 | A1* | 2/2007 | Burger | G06Q 20/382 705/64 |
| 2011/0279445 | A1* | 11/2011 | Murphy | G06F 3/04842 345/419 |
| 2012/0194553 | A1* | 8/2012 | Osterhout | G02B 27/0093 345/633 |
| 2014/0244160 | A1* | 8/2014 | Cragun | G01C 21/20 701/436 |
| 2014/0247283 | A1* | 9/2014 | Jo | G06T 11/001 345/633 |
| 2014/0289108 | A1* | 9/2014 | Thomas | G07F 19/204 705/41 |
| 2015/0198446 | A1* | 7/2015 | Perez | G01C 21/10 705/43 |

OTHER PUBLICATIONS

Boulanger, Application of Augmented Reality to Industrial Tele-Training, Dec. 2004, Proceedings of the First Canadian Conference on Computer and Robot Vision, 1-9.*

* cited by examiner

*Primary Examiner* — Robert Craddock
(74) *Attorney, Agent, or Firm* — Foley & Lardner LLP

(57) ABSTRACT

One embodiment of the disclosure relates to a system of servicing an automated teller machine (ATM) using a display configured to display augmented reality images. The electronic device may be configured to receive low-level diagnostic information from the malfunctioning ATM. Data may be transferred to a central location, wherein the data is analyzed and a solution to the problem of the malfunctioning ATM is determined and transferred back to the electronic device. In some embodiments, the electronic device displays components of the ATM using augmented reality such that a technician viewing the display may visualize the components of the ATM and receive instructions regarding the repair or care of the ATM.

3 Claims, 4 Drawing Sheets

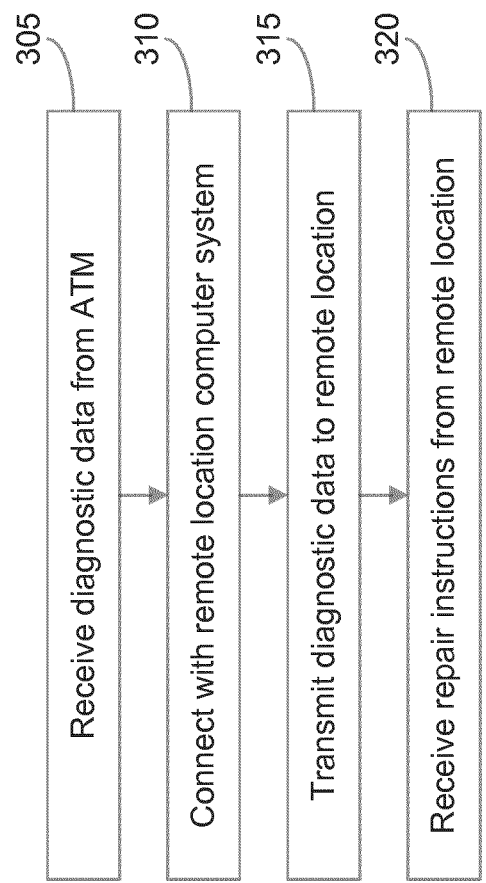

SYSTEMS AND METHODS FOR AUTOMATED TELLER MACHINE REPAIR

CROSS-REFERENCE TO RELATED PATENT APPLICATIONS

This application claims priority from Provisional Application U.S. Application 61/935,274, filed Feb. 3, 2014, which is incorporated herein by reference in its entirety.

BACKGROUND OF THE INVENTION

The present disclosure relates generally to the repairing and servicing of automated teller machines (ATMs).

Automated teller machines (ATMs) are widely used throughout the world to extend financial services to customers of financial institutions. ATMs provide customers with a variety of secure financial services without the assistance of a human teller. For example, these capabilities may include depositing, withdrawing, or transferring funds, exchanging currency, selecting and viewing account balances, statements, or credit limits, purchasing items such as stamps or gift cards, managing accounts and profiles, etc.

As with any mechanical device, ATMs are prone to malfunction. Using a variety of diagnostic and repair tools to complete their work, ATM technicians diagnose issues with malfunctioning ATMs and work to fix the equipment to ensure proper function. When an ATM malfunctions, the ATM is often first seen by a low-level technician (e.g., level one technician), who possesses a basic understanding of the ATM. Level one technicians may be an owner or custodian of an ATM, tellers, retail bankers, or other employees working at a bank having a minimal knowledge level or basic training regarding ATM repair. If a level one technician is unable to fix the problem, a level two technician, who may have a medium level of training and understanding of the ATM, may be beckoned to fix the problem. A level three technician, who may have a higher level of training and understanding, may ultimately be required to fix the ATM's malfunction. The cost of ATM repair may increase with the technical level of the technician repairing the machine. Also, the amount of time required to repair the ATM may also increase with the technical level of the technician since higher level technicians must travel to the site of the malfunctioning ATM than higher level technicians. To provide a high level of customer service, financial institutions and ATM owners and operators may seek to minimize the down time of ATM due to technical malfunctions or problems. Thus, enhanced systems and methods of quickly and efficiently repairing ATMs are desired.

SUMMARY OF THE INVENTION

One embodiment of the disclosure relates to a system of servicing an automated teller machine (ATM) using a display configured to display augmented reality images. The electronic device may be configured to receive low-level diagnostic information from the malfunctioning ATM. The device may then transfer the data to a central location, wherein the data may be analyzed and a solution to the problem of the malfunctioning ATM may be determined and transferred back to the electronic device. In some embodiments, the electronic device displays components of the ATM using augmented reality such that a technician viewing the display may visualize the components of the ATM and receive instructions regarding the repair or care of the ATM.

Another embodiment of the disclosure relates to a method of repairing an ATM comprising receiving diagnostic data from an ATM, transferring the data to a central, remote location wherein higher level technicians are able to review the data. The method further includes receiving instructions to repair the data from the central location and viewing the instructions on a display, wherein the display portrays an augmented reality image of the ATM.

A further embodiment of the system relates to a method of remotely servicing an ATM comprising receiving diagnostic data, reviewing and analyzing the diagnostic data, and communicating with an onsite technician to help diagnose and fix a problem with the ATM. In some embodiments, the method involves communicating with the onsite technician using augmented reality devices, which are electronic devices equipped with augmented reality capabilities.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 3 is a flow diagram of a process of using a device to receive instructions on repairing an ATM according to an example embodiment.

DETAILED DESCRIPTION OF THE PREFERRED EMBODIMENTS

The systems and methods, described in greater detail below allow an ATM to be repaired in a convenient, efficient, time-saving, and cost-effective manner. The systems and methods may allow a low-level technician greater resources to fix a problem encountered by the ATM using solutions received from an electronic device or with help from a higher level technician through an electronic device without requiring the higher level technician(s) to travel to the location of the ATM.

In one embodiment, a level one technician utilizes an electronic device to assist the technician in addressing an ATM issue. The electronic device may be any portable device capable of displaying or projecting images and instructions. Electronic devices may include a tablet, laptop computer, mobile phone, handheld computing device, remote connection devices, wearable computing devices (e.g., computing eyewear) etc. The electronic devices may also comprise a computing system with a processor and non-transitory machine-readable media having instructions stored therein that, when executed by the processor, configures the electronic device to perform functions and tasks as described throughout the disclosure.

Figure 1:
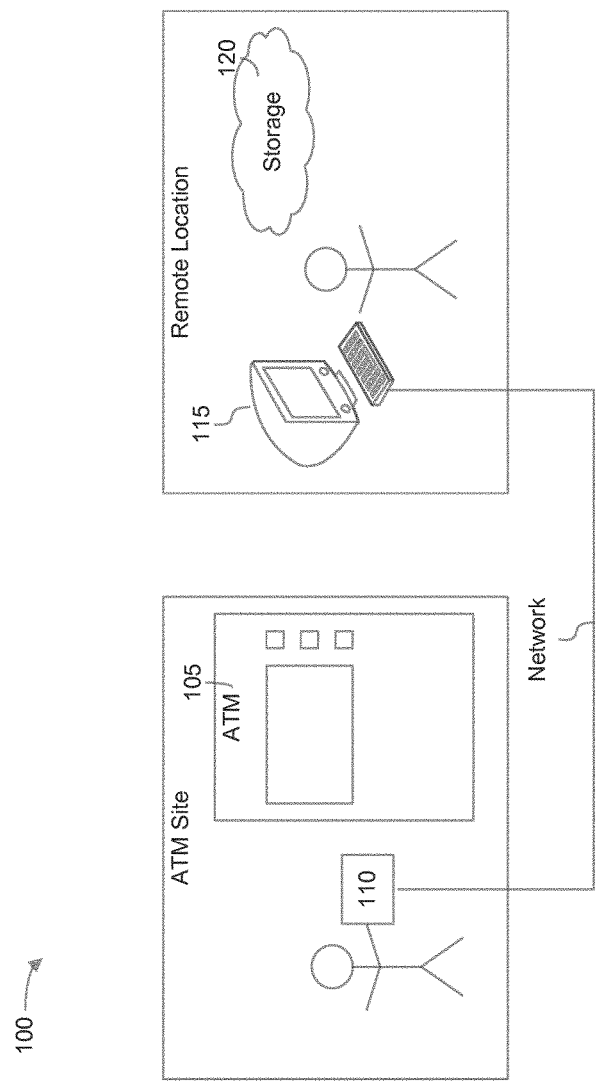
FIG. 1 is a perspective view of an ATM repair system according to an example embodiment.

Referring to FIG. 1, a perspective view of an ATM repair system 100 according to an example embodiment is shown. An ATM 105 at an ATM site is malfunctioning or experiencing an issue, and a user (i.e., low-level technician) is equipped with user device 110 to help the user fix the issue. The ATM 105 may send diagnostic information (e.g., error codes) to user device 110, and user device 110 may transfer that information to remote device 115 at a remote location, which may be staffed by higher level technicians. The user device 110 may be configured to communicate with remote device 115 over a wired or wireless network. The remote device 115 may comprise a computing system with storage 120, which may contain information regarding ATM repair. Remote device 115 may also comprise a tablet, desktop computer, laptop, mobile computing device, etc. A technician at the remote location may use remote device 115 to send information regarding ATM repair to user device 110 to enable the user the fix the problem with the ATM.

According to an embodiment, a technician may receive diagnostic information through an electronic device. The electronic device may be configured to receive low-level diagnostic information directly from a malfunctioning ATM. Low-level diagnostic information may include data relating to issues with malfunctioning components of the ATM such as mechanical hardware issues, software or computing system issues, connectivity issues, etc. For example, an ATM may be malfunctioning due to a damaged card reader, which may prevent the ATM from reading cards properly. Other hardware components of an ATM that may experience reportable issues include a printer box with paper, a vault, a currency box for storing bills within the vault, a reject box for holding rejected bills, a deposit box, rollers, suction cups and devices, sensors, operating software, etc. The information received is only related to the technical issues experienced by the ATM and does not include sensitive account information. Data may be received over a secure wired or wireless network by the electronic device. The electronic device may also be equipped with diagnostic tools, such as a program or application having instructions implemented by the processor to diagnose the technical issue. The electronic device may also be configured to contact and connect with a higher level technician to help diagnose or service an ATM. For example, error codes and video data regarding the ATM may be transmitted to the remote location. Ways of connecting with the higher level technician may include a camera video session, an online chat session, a phone call or electronic device call, etc.

To resolve technical problems, ATM technicians may perform a number of actions including finding and removing jammed bills or paper, replacing supply, removing damaged components, installing new parts, and performing preventative maintenance. Diagnostic data from the ATM may be generated by a computing system to further identify a technical issue being experienced by the ATM. The software executed by processors to operate ATMs may include code for running diagnostic tests to identify a malfunctioning component of the ATM and to generate error codes. The information may be transferred over secure networks to an electronic device. In some embodiments, the ATM contains separate logic for diagnosing issues and transferring the issues to a computing system or device. In one embodiment, the ATM is configured to output communication to the electronic device and is not configured to receive information from the electronic device (i.e., one-way data transmission). This configuration may help ensure that the ATM will be protected from outside attacks such as computer viruses via mobile device connections to the ATM.

The device may then transfer the data to a central location. The central location may be a remote location staffed by higher level technicians, wherein the data is analyzed. A solution to the problem of the malfunctioning ATM may be determined based on the transferred data, data from similar systems in the area, a technician's personal knowledge or experience, etc. Once a solution to the problem is determined, information or data may be transferred back to the electronic device, where an onsite technician may view the information on a display. The data may be displayed on the device by way of a display to aid a receiver in understanding and ultimately addressing the problem with the ATM. In some embodiments, the electronic device displays components of the ATM using augmented reality technology such that a technician viewing the display may visualize the components of the ATM and receive instructions regarding the repair or care of the ATM. For example, a tablet computer with a rear-mounted camera may capture an image of components of an ATM, and the image may be displayed on the front of the tablet with enhanced image data provided from the remote location superimposed thereon. In other embodiments, the display may comprise a transparent material capturing the vision within an area of the material and capable of being augmented using computer-generated items. In other embodiments, a projection from the electronic device may provide an overlay of an image directly onto the surface to be augmented (e.g., the surface of the ATM).

Figure 2C:
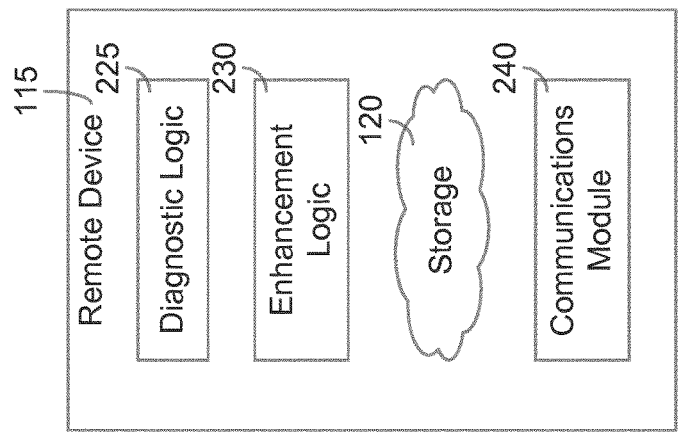
FIG. 2C is a schematic diagram of a remote device according to an example embodiment.
Figure 2B:
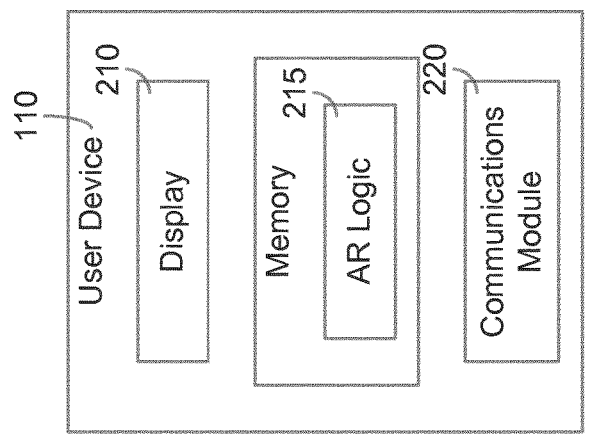
FIG. 2B is a schematic diagram of a user device according to an example embodiment.
Figure 2A:
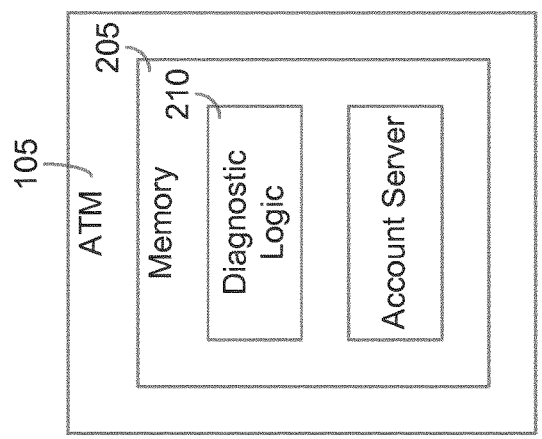
FIG. 2A is a schematic diagram of an ATM according to an example embodiment.

Referring to FIG. 2A, a schematic diagram of an ATM according to an example embodiment is shown. In one embodiment, the ATM 105 may be configured to assemble diagnostic data regarding a broken or malfunctioning component of the ATM 105 and may be configured to send diagnostic information to a user device 110. ATM 105 may contain diagnostic logic 205 disposed within memory and configured to gather diagnostic data about issues being experienced by the ATM 105. ATM 105 may also contain an account server that aids in connecting and accessing the accounts of customers to perform financial services. Diagnostic logic may transfer diagnostic data to user device 110. Diagnostic logic 205 does not communicate with the ATM account server nor does it transmit any data from the ATM account server to any electronic device. In one embodiment, ATM 105 does not receive any information from outside devices and may only be configured to transfer diagnostic information to a user device 110 by way of diagnostic logic 210.

FIG. 2B is a schematic diagram of a user device according to an example embodiment. The user device may contain a display 210, augmented reality logic 215, and communications module 220. The display 210 may be configured to display images of an environment taken by a camera on the user device 110 or enhancement data received from remote device 115. The user device 110 may contain augmented reality logic 210 disposed within the memory and configured to receive enhancement data from the remote device 115 and combine the enhancement data with an image or video taken by the user device 110. The communications module 220 may allow a user device 110 to communicate with remote device 115 over a wired or wireless network. The communications may be allowed through video, phone call, online chat session, etc.

Referring to FIG. 2C, a schematic diagram of a remote device according to an example embodiment is shown. The remote device may be configured to receive diagnostic information from the user device 110 and transfer instructive information back to user device 110. The remote device 115 may further contain diagnostic logic 225, enhancement logic 230, and communications module 240. Diagnostic logic 225 may be configured to receive diagnostic information from user device 110 and further diagnose a technical issue. Enhancement logic 230 may be configured to communicate with diagnostic logic 225 to identify a solution and transfer the solution to user device 110 to be displayed on the display 210. The communications module 240 may allow a remote device 115 to communicate with user device 110 over a wired or wireless network. The communications may be allowed through video, phone call, online chat session, etc.

FIG. 3 is a flow diagram of a process showing the use of a device to receive instructions regarding repairing an ATM. The user device receives diagnostic data from the ATM (step 305). This data may be received from diagnostic logic 210 and does not include any information from the account server. The user device may connect with a remote location computing system (310). The user device may transmit diagnostic data to a remote location (315). The user device may receive repair instructions from the remote location (320).

In one embodiment, the electronic device may utilize augmented reality technology to aid a technician in diagnosing and repairing an ATM. An augmented reality display may generate supplemented real world views of an ATM environment using computer-generated inputs such as sound, video, graphics, GPS data, etc. The augmented reality display may operate in real-time to enhance the view of the ATM. For example a technician using an augmented reality display may be able to view additional information regarding the ATM that would not be visible without enhancements. This enhanced view of the ATM provides an opportunity for the technician to interact with the displayed information. For example, a user may engage a particular component of the ATM on the tablet of a screen by enlarging the component, zooming out, rotating the component to view inner-workings, etc. The augmented reality display, in some embodiments, allows a low-level technician to receive diagnostic information as well as instructions.

The electronic device may also allow the received data to be manipulated by parties including onsite technicians using the device. The display may be configured to allow a technician at a remote location to connect with, view, and manipulate the data viewable on the display 210. In this respect, a plurality of technicians in a plurality of locations may be able to connect with the display and collectively view and manipulate the data shown. These collaborative capabilities allow the problem with the ATM to be fixed using the help of the most qualified technician without location restraints. A display employing augmented reality technology may be implemented in a variety of hardware configurations. For example, an augmented reality display may be implemented using head-mounted displays, eyewear, contact lenses, virtual retinal display, handheld displays (e.g., tablets, laptop, mobile electronic devices, etc.), spatial augmented reality, etc.

The electronic device may comprise augmented reality logic having instructions stored in a memory and configured to be executed by a processor. The instructions may direct the augmented reality logic to perform functions described throughout the disclosure, including generating augmented images for display on the electronic device, which may include generating enhancement data such as sound, video, graphics, or GPS data that augment the displayed image. An image may be provided to the electronic device by a live camera or video. Images of the ATM or the environment may also be pre-loaded onto the device depending on a particular model or brand of ATM. A technician may also capture an image of the ATM while the technician is at the scene. As another example, a tablet may have an application loaded thereon that is provided by the ATM manufacturer and that is configured to receive diagnostic data from the ATM and combine diagnostic data with image data (e.g., preloaded or captured on site) for display to a user.

Figure 4:
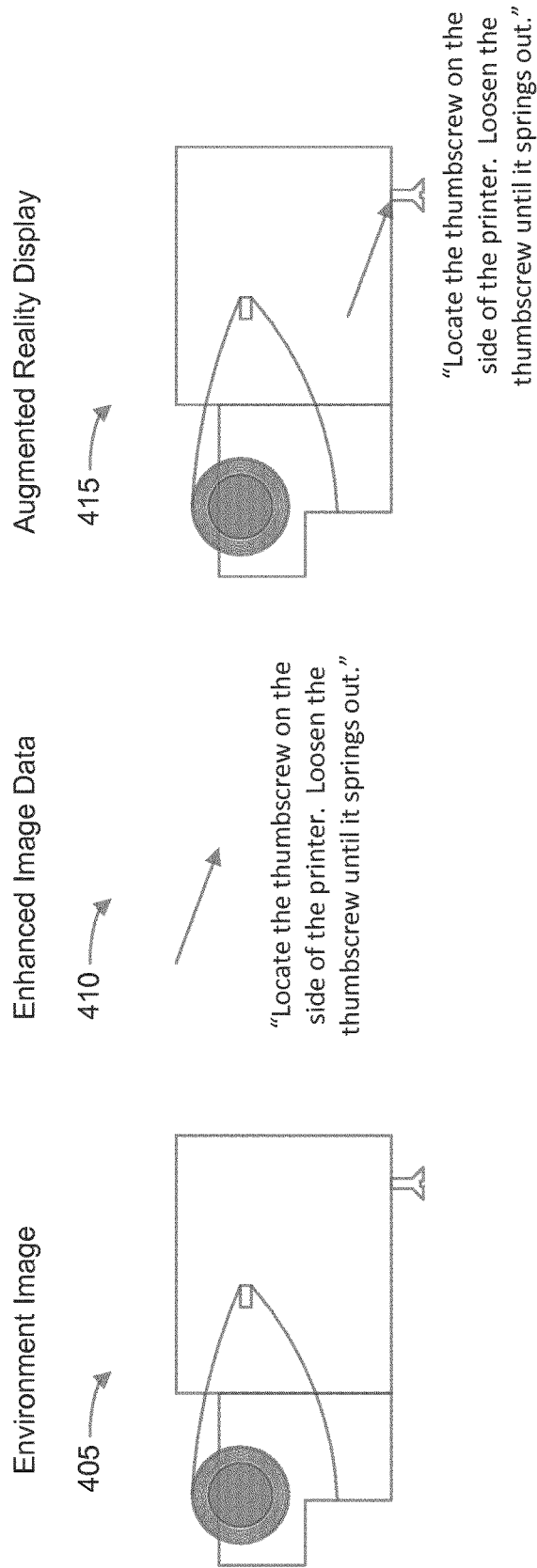
FIG. 4 is a schematic diagram of an augmented reality display according to an example embodiment.

Referring to FIG. 4, a schematic diagram of an augmented reality display on a device according to an example embodiment is shown. An augmented reality display 415 may be located on a device and created from combining one or more environment images 405 with enhanced image data 410. Environment images 405 may be still or moving images captured by a device such as a tablet having a camera. The environment image 405 may be an image of any portion of the ATM. In FIG. 4, the environment image 405 includes an image of a printer with a roll of paper and a paper cutter. Enhanced image data 410 may comprise any text, graphics, or images that may provide further detail and instruction and may also be annotations. Enhanced image data 410 may be received by the device and shown in combination with the environment image 405 to provide an augmented reality display 415. In FIG. 4, enhanced image data 405 comprises an arrow pointing to a thumbscrew on the figure along with the text, "Locate the thumbscrew on the side of the printer. Loosen the thumbscrew until it springs out." The augmented reality display may be configured to show a variety of directions, steps, and notations. For example, additional steps to fix the paper cutter of FIG. 4 may be shown prior to and following the step described and shown above. A user may use the augmented reality display to fix the problem by following the instructions shown on the display.

Enhancement data such as sound, video, graphics, GPS data, etc., may alter the displayed image. For example, a higher level technician may be able to speak commands or vocalize annotations such that the displayed image may be altered according to the technician's spoken words or directions. In another embodiment, engaging the display (e.g., touching) in different areas may allow certain sounds to be emitted that provide information about the engaged portion of the display. For example, a user viewing the ATM on a touch-responsive screen may be able to touch the image of a particular component of the information and the device may dictate programmed words relating to that particular component. For example, touching the vault on the display may cause the system to dictate the name of the component, different areas within the component, and the current status of the component (i.e. online, offline, working well, jammed, locked, secured, breached etc.) Similarly, videos and graphics may be applied to an image, still or moving, to alter or enhance the image. Similar sorts of informative data such as the name of the component and status of the component may be provided to a technician upon engaging a particular part of the display. Additionally, videos or graphics enhancing an image may provide an interactive experience for viewing hidden components and/or may provide interactive instructions on how to fix a problem with a component. The enhancement data may comprise preloaded instructions on an electronic device or may be received from a higher level technician in a separate location on a display.

In another embodiment, the electronic device may include code executable by a processor to identify internal and external components of the ATM. This identification of the components of the ATM may happen depending upon a chosen mechanism or combination of mechanisms and requirements. For example, the electronic device may be configured to identify the internal components of an ATM upon opening of the ATM door by a technician, entering a password or biometric identification, scanning a card or device, engaging a secure wired or wireless connection, etc.

In some embodiments, the electronic device also includes logic capable of determining descriptive metrics of an ATM, such as the model of the ATM, individual components of a specific ATM, etc., for example, to transmit to the remote location. This logic may communicate with the logic disposed within the ATM computing system to determine identifying information relating to a specific ATM.

In one embodiment, upon receiving instructions or enhancement data generated from a central location, a technician may use the display to further diagnose or fix an ATM. A technician may communicate with a higher level technician using a phone or video capabilities and also use the display to correct or address any issues. For example, a higher level technician may verbally discuss problems or solutions with a level one technician through a video conference while the level one technician uses the electronic device to follow along and implement the features or plans discussed by the higher level technician. This communication may be initiated by the level one technician, or the electronic device may be configured to automatically contact a higher level technician (i.e., by contacting a central remote location which may be staffed by higher level technicians). In some embodiments, the electronic device may connect with a higher level technician based upon some action, such as launching diagnostic tools or a specific application on the device, sensing the opening of the ATM door, transferring diagnostic data to a central location, etc.

Aiding a remote technician in servicing an ATM further comprises receiving data and sending information to an augmented reality display. In one embodiment, the data may be received from an electronic device controlled by a low-level technician. This data may comprise diagnostic data transferred by the ATM to the electronic device, the model and specifications of the ATM, and/or additional data from the electronic device relating to the malfunction or repair of the ATM. Based on the data received, enhancement data, such as sounds, video, images, graphics, GPS data, etc., may be generated. Relevant enhancement data may be newly generated or recalled from a variety of data storages mentioned throughout the disclosure. The enhancement data may be transferred to enhance a display such that an original image is visually altered or enhanced. For example, an original image of an ATM may be enhanced by sounds, video, images, or graphics by applying virtual objective representations of the enhancement data onto the original image. This application augments the real image of the ATM and provides more information for a technician to view and analyze than would be available with the technician's naked eye.

As noted above, embodiments within the scope of the present disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present disclosure have been described in the general context of method steps which may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" may be used herein to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design of the display system conditions and arrangement of the embodiments without departing from the scope of the present invention.

What is claimed is:

1. An ATM diagnostic and repair method comprising:
   receiving, by a first computing device, diagnostic data for an ATM;
   displaying, by the first computing device, the diagnostic data;
   receiving, by the first computing device, repair instructions from a first technician;
   communicating, by the first computing device, the repair instructions to a second computing device proximate the ATM, wherein the second computing device is useable by a second technician to repair the ATM, wherein:
   the diagnostic data is received from the ATM by the second computing device, and the diagnostic data is received by the second computing device when the second computing device is in proximity to the ATM,
   the diagnostic data is received by the second computing device from the ATM via a one-way communication link from the ATM to the second computing device, and
   the repair instructions are included in an augmented reality image.

2. The method according to claim 1, further comprising receiving, by the first computing device, an image of the ATM captured by the second computing device.

3. The method according to claim 1, wherein the second computing device is a mobile computing device.

\* \* \* \* \*